A. PACKER.
DRIVING MECHANISM FOR MOWING MACHINES.
APPLICATION FILED JULY 14, 1908.
963,638.
Patented July 5, 1910.
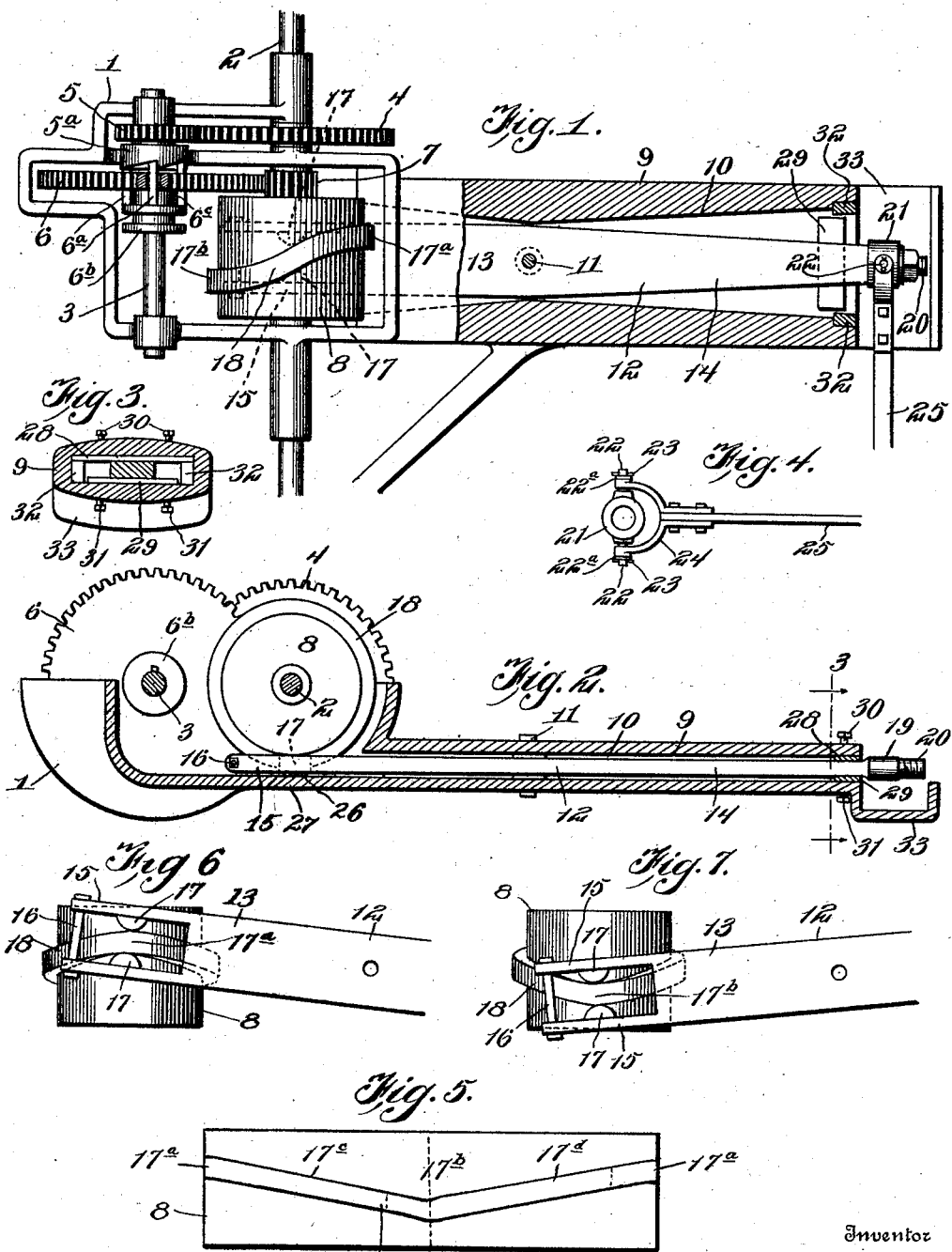
Witnesses
Louis R. Heinrichs
C. C. Hines.
Inventor
Amos Packer
By Victor J. Evans
Attorney

UNITED STATES PATENT OFFICE.

AMOS PACKER, OF DE WITT, MICHIGAN.

DRIVING MECHANISM FOR MOWING-MACHINES.

963,638.  Specification of Letters Patent.  Patented July 5, 1910.

Application filed July 14, 1908. Serial No. 443,558.

*To all whom it may concern:*

Be it known that I, AMOS PACKER, a citizen of the United States, residing at De Witt, in the county of Clinton and State of Michigan, have invented new and useful Improvements in Driving Mechanism for Mowing-Machines, of which the following is a specification.

This invention relates generally to improvements in mowing machines, and particularly to means for driving the reciprocating cutter-bars thereof, the main object of the invention being to provide a driving mechanism which insures an easy uniform back and forth motion of the cutter-bar and prevents the racking, strain and irregularities of motion incident to the use of the ordinary pitman drive.

A further object of the invention is to provide a driving mechanism for the purpose described embodying a vibratory lever actuated by a cam operated by suitable gearing and operating to impart a uniform motion to the lever at all points of the back and forth strokes of the lever, and adapted to allow and impart easy reversal of motion of the lever at the ends of its strokes to prevent jars and back strain upon the gearing, and which is further adapted to compensate for the play of the lever on its pivotal support when the cutter-bar is turned upright to an inoperative position.

A still further object of the invention is to provide a novel construction and arrangement of buffers and bearing or wear plates for the lever, which plates are readily adjustable to compensate for wear and maintain the lever in condition for movement in a true path.

With these and other objects in view, the invention consists of the features of construction, combination and arrangement of parts hereinafter fully described and claimed, reference being had to the accompanying drawings, in which:—

Figure 1 is a top plan view of a drive gearing embodying my invention, with the top of the gear casing removed and a portion of the sleeve appearing in horizontal transverse section. Fig. 2 is a vertical longitudinal section of the same. Fig. 3 is a detail section on line 3—3 of Fig. 2. Fig. 4 is a detail view showing the universal joint connection between the lever and connecting rod. Fig. 5 is a diagrammatic view of the cam showing the same as it would appear if flattened out. Figs. 6 and 7 are bottom plan views of the cam and coacting end of the lever, showing the opposite extremes of the cam rib and the positions of the lever at the ends of its strokes.

Referring to the drawing, 1 designates the inclosing casing of the driving mechanism, which may constitute a part of or be mounted in any preferred manner upon the frame of the mower, and which in practice may be provided with a suitable detachable top or cover, not shown. The side walls of the casing are provided with bearings for the main shaft or axle 2 of the mower, and also with bearings for a counter-shaft 3. Fixed to the shaft 2 is a main drive gear 4 which meshes with a pinion 5 fixed on one end of the shaft 3, and upon said shaft 3 within the casing is loosely mounted a gear wheel 6 meshing with a pinion 7 carried by a cam drum or wheel 8 loose on the shaft 2 within the casing, whereby the cam is driven in a uniform manner from said shaft.

The pinion 5 carries a clutch collar $5^a$ adapted to be engaged by pins $6^a$ on a clutch collar $6^b$ feathered to slide upon and rotate with the shaft 3. The collar $6^b$ is annularly grooved to receive the forked portion of any preferred type of shifting lever or device mounted on the casing or on the frame of the machine. The pins $6^a$ slide through transverse openings $6^c$ in the gear 6 and are adapted, by the reverse sliding movements of the collar $6^b$, to be engaged with and disengaged from the teeth of the collar $5^a$, whereby the gear 6 may be made fast or loose to throw the cutter-bar driving mechanism into or out of operation.

From the forward portion of the casing extends an arm or sleeve 9 having a longitudinal passage 10 communicating at its rear end with the casing, which passage is narrowest at a point inwardly of the central transverse line thereof, and thence flares in opposite directions toward its ends, as clearly shown in Fig. 1. Extending vertically through the narrow portion of the passage 10 is a bolt or pin 11 on which is pivotally mounted a vibrating lever 12 pivoted somewhat rearwardly of its transverse center to provide long and short arms 13 and 14. The inner or short arm 13 of the lever extends into the casing beneath the cam drum or wheel 8 and is bifurcated to form a central slot and oppositely disposed parallel arms or extensions 15 coupled at their free ends by an adjusting bolt 16. The extensions 15 are provided with curved or rounded bosses or contact heads 17 to engage the acting surface of the cam wheel or drum, which comprises a rib 18 formed upon and extending around the periphery of the drum and against the opposite faces of which the heads bear, whereby in the rotation of the drum through the described gearing the lever will be oscillated on its pivotal connection 11. The angles or points $17^a$ and $17^b$ of the cam rib contact, respectively, with the heads 17 when the lever is at the limit of its forward and return strokes, while the central portions $17^c$ and $17^d$ of the rib contact with the heads when the lever is at the intermediate point in its respective strokes, the portions $17^c$ and $17^d$ of the rib between the points $17^a$ and $17^b$ on each side of the cam being of spiral formation, so as to impart a proper degree of oscillatory movement to the lever. The rib tapers gradually on one side of the cam from the point $17^a$ to the point $17^b$, and on the reverse side of the cam from the point $17^b$ to the point $17^a$. By this construction provision is made, as clearly shown in Figs. 6 and 7, for a proper relative movement of the two heads 17 in shifting through their relatively different degrees of movement from one spiral rib portion to another at the limits of the strokes of the lever, to prevent the heads from having any binding or undue wearing action on the rib, as well as to adapt the heads to move easily around the points of the cam in reversing the direction of movement of the lever. Hence an abrupt reverse movement of the lever at the end of either stroke will be prevented, as well as all lost motion, whereby the racking and straining of the gearing produced by the abruptness or irregularities of motion in the use of the ordinary pitman gearing or grooved cam gearing will be avoided. The construction described also insures, in connection with the means for guiding the lever in its movements, hereinafter described, a conversion of rotary into rectilinear motion without vertical play or strain upon the lever, the latter being accordingly oscillated in a true horizontal plane.

The long arm 14 of the lever projects beyond the outer end of the sleeve and terminates in a reduced cylindrical portion 19 having a reduced threaded extension 20. On the extension 19 is loosely fitted a collar 21 carrying pivot pins 22 at diametrically opposite sides thereof, said pins carrying retaining washers $22^a$ secured thereon by cotter pins 23. These pins pass through the apertured ends of a yoke 24 carried by the inner end of a connecting rod 25 which transfers motion from the lever to the cutter bar, not shown. The collar permits the connecting rod to have vertical movement, while the pivot pins permit said rod to have swinging movement in a direction longitudinally of the machine, thus providing a universal joint connection which adapts the rod to compensate for the arc of movement of the lever in transmitting direct reciprocatory motion to the cutter bar.

In operation of the device, it will be understood that through the train of gears motion will be transmitted from the axle to the countershaft and thence to the cam, and that in the rotation of the latter the operating lever will be vibrated or oscillated back and forth and will transfer reciprocatory motion through the rod 25 to the cutter bar, and owing to the peculiar construction of the cam and contact heads an easy and uniform motion will be transmitted to the lever to operate the cutter bar without the strain and jerking motion produced by the driving mechanisms heretofore used. As wear on the heads and rib occurs this may be compensated for by tightening the nut on the adjusting bolt 16 to draw the heads closer together.

The curved or rounded heads and tapering of the cam rib in the manner described are important features of my invention. It is well known that the operation of an oscillatory lever by the action of a pitman or an ordinary grooved cam results in considerable strain being thrown upon the gearing when the lever reaches the end of the strokes and is about to be reversed for the return stroke, owing to the resistance of the lever in reversing its motion. This is compensated for in my improved construction by the described mode of tapering the cam rib and rounding the heads which insures an easy reversal of motion of the lever and prevents the jarring, vibration and back strain caused by an abrupt reversal. Starting at either point of the cam, in which position the lever will be practically in line with the working portion of the rib, the heads describe their different arcs around the point, and as the cam turns, the angle of the working surface of the rib with relation to the heads varies and it is necessary to compensate for this constantly changing angular relation. The taper of the portions $17^c$ and $17^d$ of the ribs to the points $17^a$ and $17^b$ permits of this change, the heads varying their point of bearing and angle to conform to the surfaces of the rib as the cam revolves, so that they will always perfectly adjust themselves to the cam, making the operation easy and with little friction at all points. The construction therefore provides for an easy operation of the lever and cutter bar at all points in the movements thereof, and it will be observed that the oppositely flaring formation of the chamber 10 permits free movement of the lever 12 and prevents binding thereof.

The cam rib 18 projects into the slot between the extremities 15 of the lever, and, in order to effectively support the bifurcated part of the lever, a bearing plate 26 is disposed transversely beneath the extremities and heads and is adjustably secured to the bottom of the casing by set screws 27, whereby it may be moved upward to compensate for wear as occasion requires. At the outer end of the sleeve are also upper and lower bearing plates 28 and 29 adjustable respectively by set screws 30 and 31 mounted upon the top and bottom walls of the sleeves. The upper plate 28 extends fully across the sleeve and rests at its ends upon cushioned buffer blocks 32 fitted in recesses 3 in the side walls of the sleeve, said blocks yieldingly supporting said upper plate. The lower plate 29 is of a length corresponding approximately to the distance between the buffer blocks, and both plates may be adjusted by the screws to bear easily upon the upper end and lower surfaces of the arm 14 of the lever to prevent vertical play thereof and insure oscillatory motion of said arm in a straight path. The function of the blocks 32 is to cushion the arm 14 at the ends of its stroke, thus adding to the ease of operation thereof. The outer end of the sleeve is provided with a guard 33 to protect the coupled ends of the lever and connecting rod from injury.

From the foregoing description, it will be seen that my invention provides a cutter driving mechanism which does away with the usual lost motion, reduces the draft and increases the power and positiveness of action of the mechanism, and which also eliminates to a large extent the wear and tear caused by the jerks and jars of the ordinary pitman mechanism at the shoe coupling. Another advantage gained by the use of my improved cam mechanism is that upon releasing the clutch and freeing the gear 6 the lever may be allowed to vibrate when the cutter bar is turned up to an inoperative position under the pressure thrown thereon, since the pressure of the heads 17 on the cam 18 will effect a slight backward revolution thereof, thus allowing the lever to accommodate itself to the movement of the cutter bar as it is swung upward, insuring an easy movement thereof and a reduction of strain on the gearing.

Having thus fully described the invention, what is claimed as new is:—

In a driving mechanism for the cutting knives of mowers, the combination of a casing having a sleeve extending therefrom, a cam mounted within the casing, means for operating the cam, an oscillatory lever extending through the sleeve and projecting at one end into the casing and at its opposite end beyond the sleeve, the first named end being adapted to be operated by the cam to oscillate said lever, an adjustable bearing plate upon the casing beneath the inner end of the lever and holding the same in engagement with the cam, buffers at the outer end of the sleeve adapted to be engaged by the lever at the extremes of its strokes, and upper and lower adjustable bearing pieces upon the sleeve engaging the adjacent surfaces of the lever and disposed between said buffers.

In testimony whereof I affix my signature in presence of two witnesses.

AMOS PACKER.

Witnesses:
 FLORENCE CROOK,
 C. C. HINES.